United States Patent [19]

Seki et al.

[11] 4,301,500

[45] Nov. 17, 1981

[54] GATE CONTROL SYSTEM OF THE INVERTER USING GATE-TURN-OFF THYRISTORS

[75] Inventors: Nagataka Seki, Fuchu; Yukinori Tsuruta, Sagamihara, both of Japan

[73] Assignee: Tokyo Shibaura Denki Kabushiki Kaisha, Kawasaki, Japan

[21] Appl. No.: 122,826

[22] Filed: Feb. 19, 1980

[30] Foreign Application Priority Data

Feb. 20, 1979 [JP] Japan .................................. 54-18730

[51] Int. Cl.³ .......................................... H02H 7/122
[52] U.S. Cl. ...................................... 363/58; 363/137
[58] Field of Search ................................ 363/55-58, 363/137, 138

[56] References Cited

U.S. PATENT DOCUMENTS 4,118,770 10/1978 Sugimoto et al. .................. 363/138

4,215,394 7/1980 Galloway et al. .................. 363/137

Primary Examiner—William M. Shoop
Attorney, Agent, or Firm—Oblon, Fisher, Spivak, McClelland & Maier

[57] ABSTRACT

There are arranged an oscillator for generating a first pulse signal on which the AC output frequency of the inverter is based, a delay circuit for generating a second pulse signal delayed for a predetermined period of time from the first pulse signal, and a ring counter for generating responsive to the second pulse signal a phase reference signal corresponding in phase to the AC output of the inverter. An ON pulse is generated responsive to the second pulse and the phase reference signal and an OFF pulse responsive to the first pulse and the phase reference signal. A negative bias signal is generated following the OFF pulse. At the time of operation stop the negative bias signal following the ON and OFF pulses is applied to GTO thyristors simultaneously.

9 Claims, 6 Drawing Figures

4,301,500

GATE CONTROL SYSTEM OF THE INVERTER USING GATE-TURN-OFF THYRISTORS

The present invention relates to a gate control system of the inverter using gate-turn-off thyristors.

Gate-turn-off thyristors or GTO thyristors have been recently developed to put on the market a GTO thyristor for use with large power ranging from 200 A up to 600 A. GTO thyristors serve to simplify the main circuit, to enhance the efficiency, and to progressively reduce the noise, but are inferior in dv/dt to the ones of usual type because the short-circuit emitter structure can not be employed due to the feature inherent to GTO thyristors. The capacitor of 0.1–0.2 $\mu$F may be employed in a snubber circuit used to protect the thyristor of usual type, but the one must be of over 1–2 $\mu$F in the case of the GTO thyristor. In addition, the GTO thyristor makes it necessary to use three kinds of signals, that is, ON pulse, OFF pulse and negative bias signal to achieve the gate control thereof. Particularly, in the case where the GTO thyristor is used in the inverter or the like, the timing control of OFF pulse and ON pulse is most important, thus causing problems to often occur in how to select the timing.

The object of the present invention is therefore to provide a gate control system most suitable for use in the inverter in which GTO thyristors are used.

According to the present invention, there is provided a gate control system of the inverter including a means for generating a first pulse on which the output frequency of the inverter is based and a second pulse delayed for a predetermined period of time after the first pulse is generated, and wherein the ON pulse is generated synchronously with the second pulse, the OFF pulse synchronously with the first pulse, and the negative bias signal after the OFF pulse is generated.

This invention can be more fully understood from the following detailed description when taken in conjunction with the accompanying drawings, in which.

Figure 1:
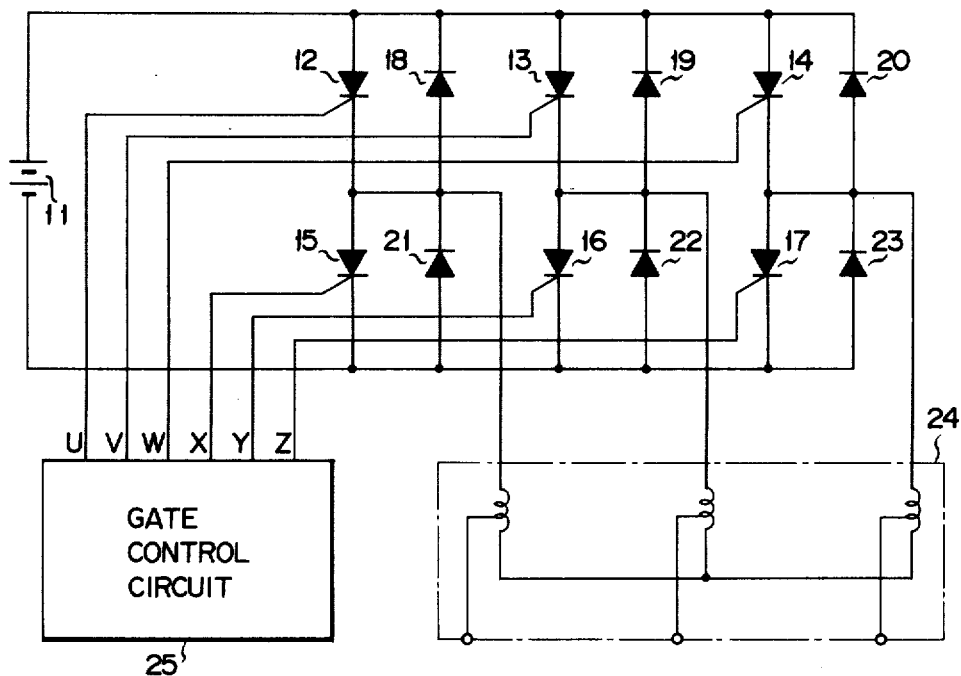
FIG. 1 is a circuit diagram of the inverter employing a gate control system of the present invention.

In FIG. 1 is shown a three phase bridge inverter circuit. In this circuit the positive terminal of a DC power source 11 is connected to anodes of GTO thyristors 12, 13 and 14 while the negative terminal thereof to cathodes of GTO thyristors 15, 16 and 17. The cathode of the GTO thyristor 12 is connected to the anode of the GTO thyristor 15, the cathode of the GTO thyristor 13 to the anode of the GTO thyristor 16, and the cathode of the GTO thyristor 14 to the anode of the GTO thyristor 17, respectively. GTO thyristors 12, 13, 14, 15, 16 and 17 are connected in the reverse direction and in parallel with diodes 18, 19, 20, 21, 22 and 23, respectively. The connection points between thyristors 12 and 15, between thyristors 13 and 16, and between thyristors 14 and 17 are connected to three phase windings of a three phase transformer 24, respectively. Gates of thyristors 12 to 17 are connected to gate signal output terminals U, V, W, X, Y and Z of a gate control circuit 25, respectively.

Figure 2:
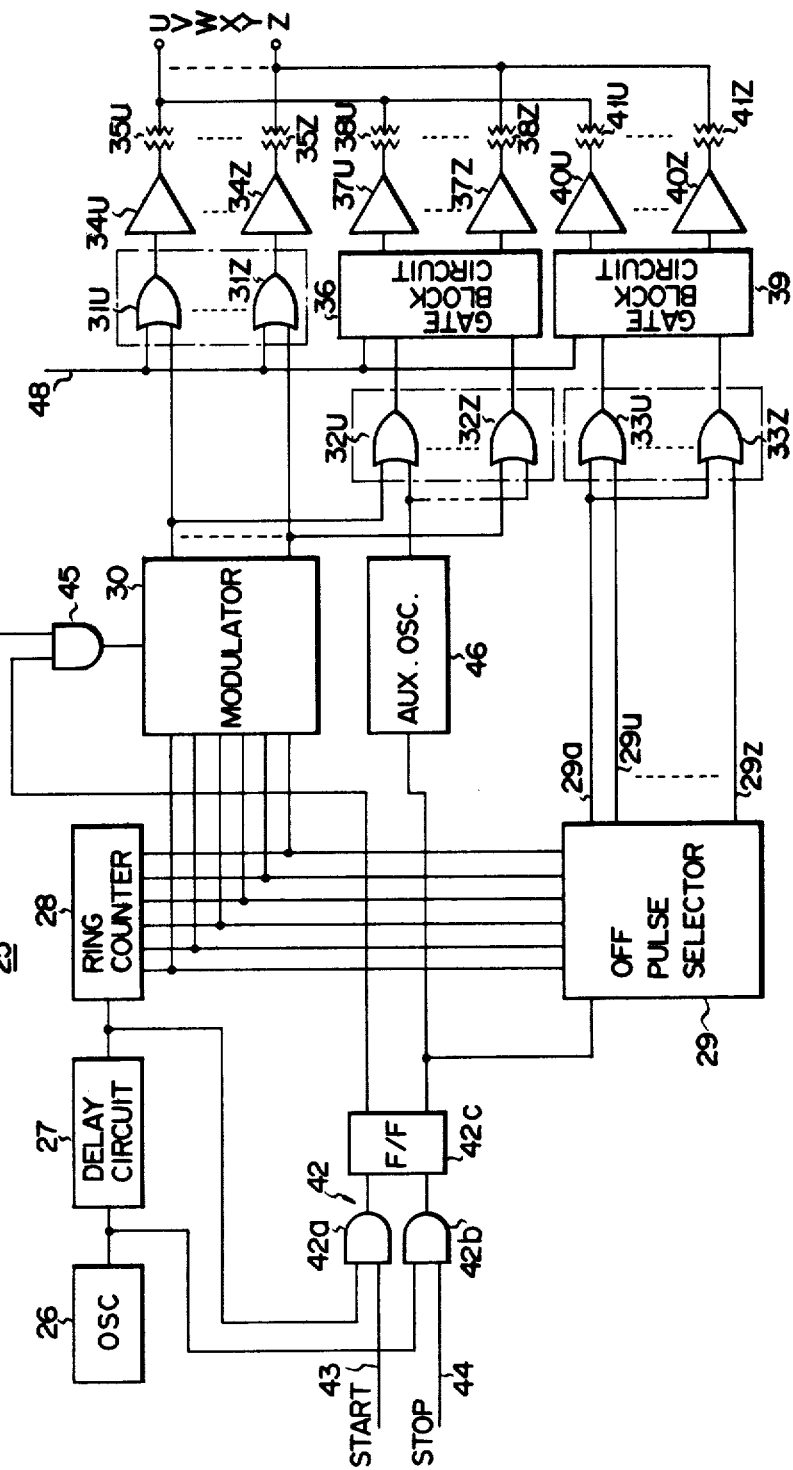
FIG. 2 is a circuit diagram showing the gate control circuit included in the circuit shown in FIG. 1.

The gate control circuit 25 is shown in FIG. 2. In the gate control circuit 25 shown in FIG. 2 an oscillator 26 generates a pulse signal having a frequency six times higher than the frequency of the AC output of the three phase inverter, for example, a pulse signal of 300 Hz in the case where the frequency of the latter is 50 Hz. The output of this oscillator 26 is connected to the input of a delay circuit 27 which serves to delay the output pulse signal of the oscillator 26 for a predetermined period of time and whose output is connected to the input of a ring counter 28. This ring counter 28 is composed six stages and six stage output terminals thereof are connected to an OFF pulse selection circuit 29 and a modulator 30. Six output terminals of the modulator 30 are connected to the ones of input terminals of OR gates 31U to 31Z while to the ones of input terminals of OR gates 32U to 32Z. Output terminals 29U to 29Z of the OFF pulse selector 29 are connected to the ones of input terminals of OR gates 33U to 33Z.

Output terminals of OR gates 31U to 31Z are connected through amplifiers 34U to 34Z to pulse transformers 35U to 35Z, respectively. Output terminals of OR gates 32U to 32Z are connected through a gate block circuit 36 and amplifiers 37U to 37Z to pulse transformers 38U to 38Z, respectively. Output terminals of OR gates 33U to 33Z are connected via a gate block circuit 39 and amplifiers 40U to 40Z to pulse transformers 41U to 41Z, respectively. Output terminals of pulse transformers 35U, 38U and 41U are connected one another and to the output terminal U of the gate control circuit 25. In such manner, output terminals of pulse transformers 35U to 35Z, 38U to 38Z and 41U to 41Z are connected to output terminals U, V, W, X, Y and Z of the gate control circuit 25.

Output terminals of the oscillator 26 and delay circuit 27 are connected to the ones of input terminals of AND gates 42a and 42b of a synchronous circuit 42, respectively. The others of input terminals of AND gates 42a and 42b are connected to start and stop signal lines 43 and 44, respectively, and output terminals of AND gates 42a and 42b to set and reset input terminals of a flip-flop 42c, respectively. Set and reset output terminals of the flip-flop 42c are connected to the one of input terminals of an AND gate 45 and to the trigger terminal of an auxiliary oscillator 46, respectively. The output terminal of the auxiliary oscillator 46 is connected to the others of input terminals of OR gates 32U to 32Z. The other of input terminals of the AND gate 45 is connected to an oscillator 47 which generates a signal of, for example, 20 KHz. A commutation failure signal line 48 is connected to the others of input terminals of OR gates 31U to 31Z and to control input terminals of gate block circuits 36 and 39.

Figure 3:
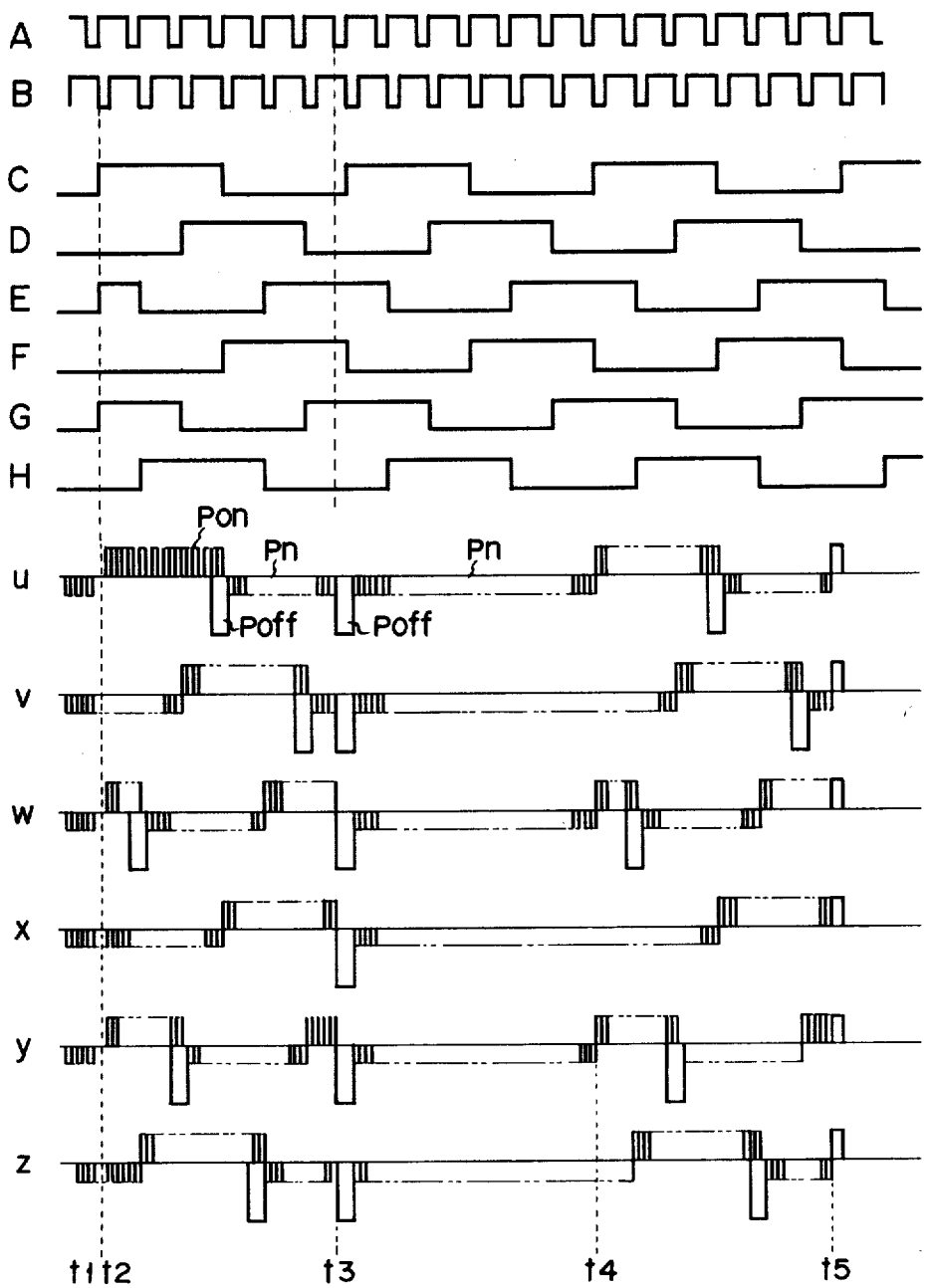
FIG. 3 is a time chart of signals of the gate control circuit shown in FIG. 2.

The gate control system of the inverter of the present invention will be now described with reference to the circuit shown in FIG. 2 and the time chart shown in FIG. 3. The oscillator 26 generates a signal A of 300 Hz and the delay circuit 27 generates a signal B delayed for a predetermined period of time, for example, equal to the pulse width of the signal A. When the signal B is applied to the ring counter 28, the ring counter 28 starts to count synchronizing with this signal B. Therefore, output signals C, D, E, F, G and H are outputted from six stages of the ring counter 28, respectively. These signals C to E and F to H are shifted 120 degrees in phase from one another.

When the operation of the inverter is started at time $t_1$, a start signal is delivered through the start signal line 43 to the AND gate 42a. Responding to the trailing edge of the pulse of the signal B, the AND gate 42a generates an output signal to set the flip-flop 42c. The set signal of the flip-flop 42c is applied to the AND gate 45 to open the latter. As the result, the output signal of 20 KHz is supplied from the oscillator 47 via the AND gate 45 to the modulator 30. The signal of 20 KHz is modulated in this modulator 30 by means of signals C to H of the ring counter 28. Modulated signals are supplied via OR gates 31U to 31Z and amplifiers 34U to 34Z to pulse transformers 35U to 35Z while via OR gates 32U to 32Z, gate block circuit 36, and amplifiers 37U to 37Z to pulse transformers 38U to 38Z. On the other hand, the OFF pulse selector 29 generates OFF pulses synchronizing with signals C to H of the ring counter 28 and the signal A of the oscillator 26. These OFF pulses are supplied through OR gates 33U to 33Z, gate block circuit 39 and amplifiers 40U to 40Z to pulse transformers 41U to 41Z. Outputs of pulse transformers 35U, 38U and 41U are composed to a signal u, which is supplied through the terminal U to the gate of the GTO thyristor 12 of the inverter shown in FIG. 1. This signal u is formed by an ON pulse generated by the pulse transformer 35U responding to the trailing edge of the signal B and the leading edge of the signal C, on OFF pulse generated by the pulse transformer 38U responding to signals A and C, and a negative bias signal generated by the pulse transformer 41U after the OFF pulse. Namely, the thyristor 12 is turned ON by the ON pulse of this signal u, then OFF responsive to the OFF pulse, and thereafter held OFF by the negative bias signal. In such manner, output signals of pulse transformers 35U to 35Z, 38U to 38Z and 41U to 41Z are correspondingly composed to signals u, v, w, x, y and z, which are supplied via terminals U, V, W, X, Y and Z to gates of GTO thyristors 13, 14, 15, 16 and 17. The gate control of each of thyristors 12 to 17 is achieved by these signals U to W and X to Z, so that inverter outputs, each shifted 120 degrees from the other, are supplied to the three phase transformer 24, from which three phase power is delivered.

During the normal operation output signals formed between times $t_2$ and $t_3$ are repeatedly sent from the gate control circuit 25 and three phase power from the three phase transformer 24. If the operation is stopped at time $t_3$, a stop signal will be supplied through the stop signal line 44 to the AND gate 42b, which generates an output signal synchronizing with the leading edge of the pulse of the signal A, thereby to reset the flip-flop 42c. The auxiliary oscillator 46 is triggered by the reset output signal from the flip-flop 42c, and an OFF pulse is sent from the output terminal 29a of the OFF pulse selector 29. This OFF pulse is supplied via OR gates 33U to 33Z, gate block circuit 39 and amplifiers 40U to 40Z to pulse transformers 41U to 41Z. The auxiliary oscillator 46 supplies an output signal via OR gates 32U to 32Z, gate block circuit 36 and amplifiers 37U to 37Z to pulse transformers 38U to 38Z. At this time the AND gate 45 is closed to block the output signal of the oscillator 47. As the result, gate control signals u to z shown between times $t_3$ and $t_4$ in FIG. 3 are sent via terminals U, V, W, X, Y and Z from the gate control circuit 25. These gate control signals comprises OFF pulses synchronized with the leading edge of the signal A and negative bias signals following these OFF pulses, and when controlled by these gate control signals, GTO thyristors 12 to 17 are turned OFF at the same time. When the operation is again started after the stop of operation, the same performance as already described during the operation is achieved. When commutation failure occurs at time $t_5$ during this normal operation, a commutation failure signal is supplied via the signal line 48 to control input terminals of OR gates 31U to 31Z and gate block circuits 36 and 39. The commutation failure signal is supplied via OR gates 31U to 31Z, amplifiers 34U to 34Z and terminals U to Z to GTO thyristors 12 to 17, thereby to cause all of GTO thyristors 12 to 17 to be triggered. And at this time gate block circuits 36 and 39 function to block negative bias signals and OFF pulses sent from OR gates 32U to 32Z and 33U to 33Z, so that no further signal appears after the commutation failure signal as shown in FIG. 3 keeping all of thyristors to be completely triggered. This state, that is, the state after time $t_4$ represents a state of accident stop, and either a circuit breaker or no-fuse breaker inserted in the main circuit is usually operated ready for commutation failure. Therefore, when either the circuit breaker or no-fuse breaker is reclosed after an inspection required or countermeasure against accident is taken, the inverter is again returned to the original state before time $t_1$.

The ON pulse Pon employed to achieve the gate control in the above-described gate control circuit is a pulse current having a crest value of 0.5 to 0.6 A, and the OFF pulse Poff is a pulse current having a crest value of 100 to 200 A and a pulse width of 50 to 60 μs. The superposed portion between the ON pulse and OFF pulse has the ON pulse seemingly vanished therefrom, but only the OFF pulse having the predetermined pulse width occupied therein. According to this way it becomes unnecessary to make the pulse width of the ON pulse narrow and to adjust the timing between ON and OFF pulses.

Figure 4:
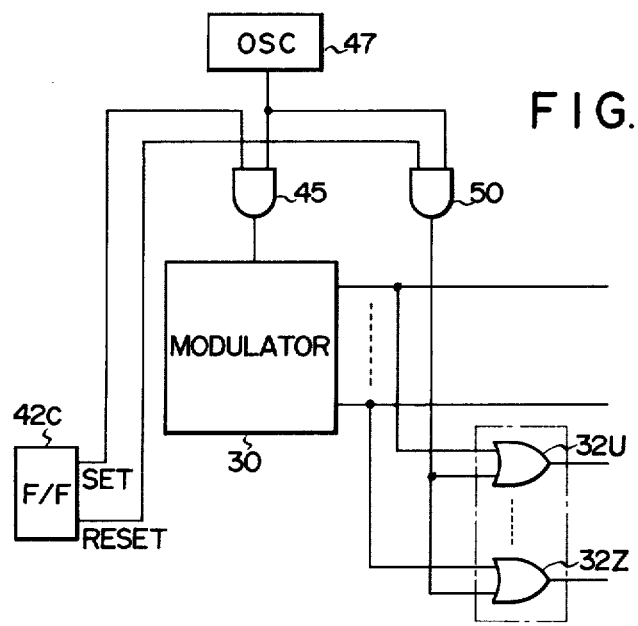
FIG. 4 is a circuit diagram showing another example of the gate control system of the present invention.
Figure 5:
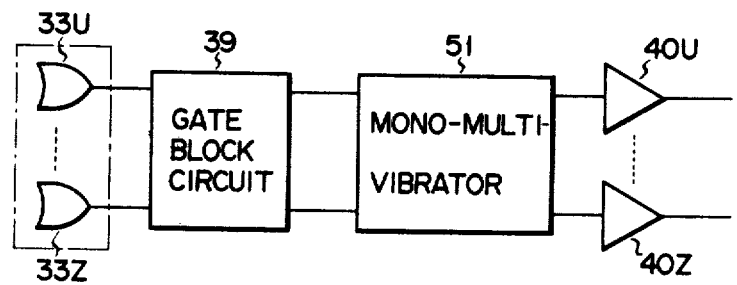
FIG. 5 is a circuit diagram showing a further example of the gate control system of the present invention in which the pulse width of the OFF pulse can be adjusted.

The auxiliary oscillator employed in the above-described embodiment of the present invention may be omitted when is added, as shown in FIG. 4, to the circuit an AND gate 50 which opens responsive to the reset signal of the flip-flop 42c and through which the signal of 20 KHz is supplied to OR gates 32U to 32Z. When a mono-multivibrator 51 is inserted between the gate block circuit 39 for OFF pulses and amplifiers 40U to 40Z as shown in FIG. 5, it becomes possible to adjust the pulse width of the OFF pulse Poff. It is also possible to change the shift difference between signals A and B by adjusting the delay time of the delay circuit shown in FIG. 2. The shift difference and pulse width are adjusted correlative to each other.

Figure 6:
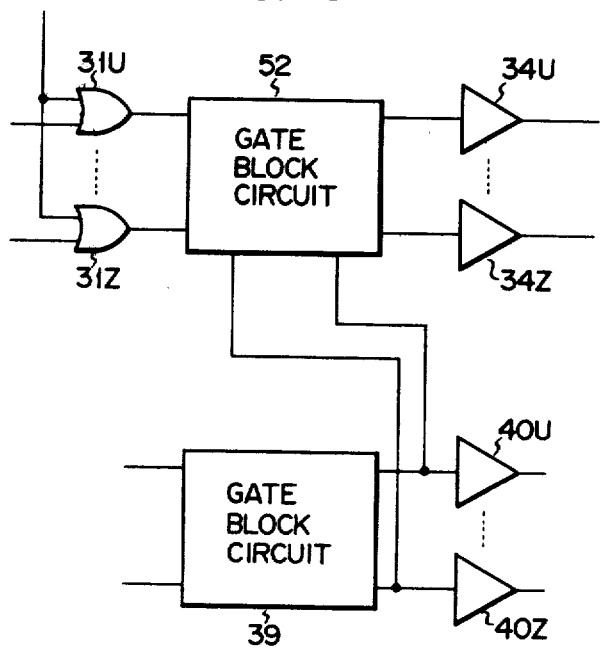
FIG. 6 is a circuit diagram showing a still further example of the gate control system of the present invention in which another ON pulse is not generated during the superposing period of ON and OFF pulses.

In a modification shown in FIG. 6 a gate block circuit 52 is arranged between OR gates 31U to 31Z for ON pulses and amplifiers 34U to 34Z so as not to send an ON pulse during the superposed period of the ON pulse Pon and OFF pulse Poff.

According to the gate control system of the GTO thyristor inverter of the present invention as described above, the negative bias signal is applied through pulse transformers to GTO thyristors during the stop of the inverter, thus preventing GTO thyristors from being mistakenly triggered, and making small the capacitance of the capacitance element of the snubber circuit connected to GTO thyristors. In addition, a part of the ON pulse can be vanished by superposing ON and OFF pulses via pulse transformers, with the result that the process in which gate control pulse signals are formed can be simplified.

What we claim is:

1. A gate control system of the inverter for generating AC output of a predetermined frequency and having plural GTO thyristors connected in a predetermined manner comprising:
   a means for generating a first pulse signal on which the frequency of the AC output is based;
   a means for generating a second pulse signal delayed for a predetermined period of time from the first pulse signal;
   a phase reference signal generating means for generating responsive to the second pulse signal a reference signal corresponding to the phase of the AC output of the inverter;
   an ON pulse generating means synchronizing with the second pulse and the phase reference signal to generate ON pulses corresponding to the GTO thyristors, respectively;
   an OFF pulse generating means synchronizing with the first pulse and the phase reference signal to generate OFF pulses after the ON pulses;
   a negative bias signal generating means for generating negative bias signals after the OFF pulses;
   an operation stop means synchronizing with the first pulse to supply the OFF pulses and then the negative bias signals to the GTO thyristors at the time when the operation of the inverter is to be stopped; and
   a commutation failure protecting means for supplying the ON pulses to the GTO thyristors at the time of commutation failure.

2. A gate control system according to claim 1 wherein the ON pulse generating means comprises an oscillator for generating a signal of a predetermined frequency and a modulator for modulating the signal of this oscillator by the signal of the phase reference signal generating means.

3. A gate control system according to claim 1 wherein the second pulse generating means comprises a delay circuit for delaying the first pulse signal of the first pulse generating means for a predetermined period of time.

4. A gate control system according to any of claims 1, 2 and 3 wherein the phase reference signal generating means comprises a ring counter of plural stages operated responsive to the second pulse signal of the second pulse generating means to generate phase reference signals each shifted in phase from the other.

5. A gate control system according to any of claims 1, 2, 3 and 4 wherein the operation stop means comprises a means synchronizing with a stop signal generated at the time of operation stop and with the first pulse signal to generate a control signal, a means for generating an OFF pulse responsive to the control signal, and an auxiliary oscillator for generating a negative bias signal responsive to the control signal.

6. A gate control system according to claim 2 wherein the operation stop means comprises a means synchronizing with a stop signal generated at the time of operation stop and with the first pulse signal to generate a control signal, a means for generating an OFF pulse responsive to the control signal, and a means for leading, responsive to the control signal, the output signal of the predetermined frequency signal oscillator to the GTO thyristors.

7. A gate control system according to claim 1 wherein the commutation failure compensation means comprises a means for leading to the GTO thyristors a commutation failure signal generated at the time of commutation failure and a block circuit for blocking the ON and OFF pulses.

8. A gate control system according to claim 1 wherein the OFF pulse generating means has a means for setting the pulse width of the OFF pulse.

9. A gate control system according to claim 1 wherein the ON pulse generating means includes a means for blocking the ON pulse responsive to the OFF pulse.

* * * * *